Figure 1:
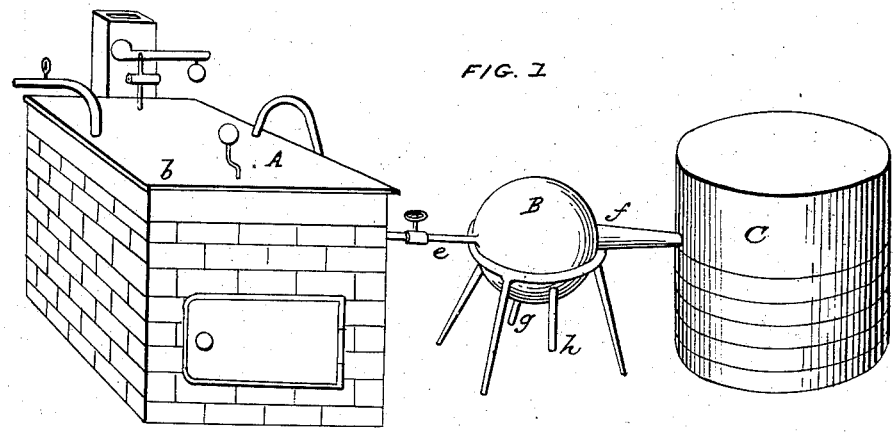

S. C. SALISBURY.

Converting Iron into Steel.

No. 68,118.

Patented Aug. 27, 1867.

WITNESSES:

INVENTOR

United States Patent Office.

SILAS C. SALISBURY, OF NEW YORK, N. Y.

Letters Patent No. 68,118, dated August 27, 1867.

---

IMPROVEMENT IN CONVERTING IRON INTO STEEL.

---

The Schedule referred to in these Letters Patent and making part of the same.

---

TO ALL WHOM IT MAY CONCERN:

Be it known that I, SILAS C. SALISBURY, of the city of New York, in the county of New York, and State of New York, have invented a new and improved Method or Process for Converting Iron into Steel; and I do hereby declare that the following is a full, clear, and exact description thereof, and of its mode or manner of operation, reference being had to the accompanying drawings and to the letters of reference marked thereon, and making a part of this specification.

My invention consists in a new and improved method or process of converting iron into steel, while the iron or metal is in a liquid or fluid state, and as it is produced by and delivered from the furnace in which the ores are reduced.

In the reduction of iron ores as ordinarily effected, and their conversion into steel, the ores, which are generally oxides, are mixed with charcoal, coke, or other fuel in a furnace and there subjected to great heat, and while being reduced therein to a liquid condition are deprived of their oxygen, and also carbonized very highly, the product of the furnace being what is known as cast iron. Such iron is afterwards decarbonized by puddling or some equivalent process, and converted into soft iron, and then by a further process again carbonized sufficiently to form steel. The conversion of iron into steel as ordinarily effected is thus a succession of processes which consume much time and involve large expense in their complete performance.

My invention has for its object the conversion of the iron into steel while the iron is in a fluid state, and as it is delivered from the furnace in which the ores are reduced, and can be applied to the conversion of such metal when produced in furnaces in which the ores are reduced in the ordinary manner, or when produced in furnaces using processes by which the iron is but slightly carbonized and more or less refined as it is melted from the ores.

My process consists in first subjecting the fluid metal, after having been received from the furnace into suitable tanks or vessels, to the action of currents or blasts of steam of hydrogen and oxygen very highly heated, and under considerable pressure, in combination or connection with the ordinary air-blast, and afterwards subjecting the same metal to the action of currents or blasts of like highly heated steam or hydrogen and oxygen, in combination with hydrocarbon gas and manganese.

The fluid iron as it is discharged from furnaces, in which it has been reduced in the ordinary manner, is generally not only very highly carbonized, but also retains, to a very great extent, the various impurities which existed in the ore. By forcing through the fluid mass and subjecting it to the action of steam or hydrogen and oxygen, and the air-blast, such metal is decarbonized, and also at the same time purified, the air-blast and the oxygen decarbonizing the metal, and the hydrogen, by its greater affinity for the sulphur and other impurities derived from the ores, and from the coal or fuel used in the blast-furnace, taking up and carrying off such impurities from the metal. The currents or blasts of such gases and of the air are passed through the metal until the mass is thoroughly decarbonized and purified. The relative proportion of such gases or steam and air-blast used for such purposes is about sixty to seventy per cent. of steam or hydrogen and oxygen and thirty or forty per cent. of the air-blast. After the metal has thus been decarbonized and refined, the air-blast is discontinued, and in place thereof a blast or current of hydrocarbon gas derived from some hydrocarbon which is wholly free from sulphur, phosphorus, or like impurity, is caused to pass through the fluid metal in combination with the hydrogen and oxygen or steam-blast, the use of which is continued. The metal is subjected to the action of such gases until it is sufficiently carbonized for the purposes required. To improve the steel there is also introduced in the fluid metal about one per cent. in weight of manganese, which may be mechanically mixed with the mass or carried in the form of powder in connection with the currents or blasts of the gases.

The drawings represent an apparatus suitable for highly heating the steam or hydrogen and oxygen, and giving it any desired pressure, and also for forcing such gases or steam with the air-blast or hydrocarbon gas through the melted mass of metal.

Figure 2:
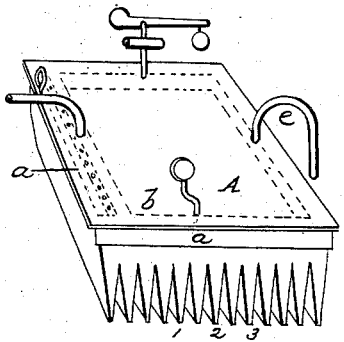
Figure 3:
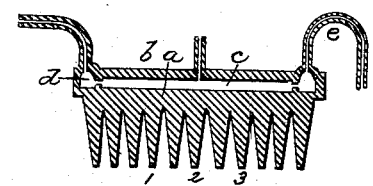

Figure 1 is a general view of such apparatus.
Figure 2 is a detached view of the gas-generator.
Figure 3 is a vertical section of fig. 2.

The steam-generator or heater A consists of two flat metallic plates $a$ and $b$, of any size required, which are firmly secured together, and between which is a shallow space or chamber, $c$, for the production of the gases.

The plates are made sufficiently strong to bear any pressure that may be required, the steam being subjected therein to a high pressure before being allowed to pass therefrom. Steam or water is supplied to the chamber $c$ through the conduit or receiving-tube $d$, which extends along one side of the chamber $c$, and connects with the same by means of numerous small holes, as shown in fig. 2, by means of which the water or steam is brought into contact with the whole of the surface of the plate $a$ so as to produce a more rapid action and greater heat. Such steam-generator is constructed with a flat evaporating surface, as such a surface is especially favorable to rapid evaporation; but, as water will evaporate from a flat evaporating surface many times faster than heat can ordinarily be imparted to it, the under side of such plate is constructed with ribs 1, 2, 3, which extend down into the furnace, greatly increasing the fire surface, and thereby heating the evaporating surface as rapidly as demanded for constant evaporation. The steam is raised to a temperature of from about 700° to 800° or more Fahrenheit, and is also subjected in the generator to a pressure of from fifteen to twenty pounds or upwards to the square inch before they pass therefrom. After having been thus heated under such pressure they pass by means of a pipe, $e$, into the vacuum-chamber B, such pipe $e$ extending within such chamber opposite to the discharge pipe $f$, or entering within such chamber B into the expanded mouth of such discharge pipe $f$. Into the vacuum-chamber B also enter two other pipes, $g$ and $h$, one connecting with the retort supplying the hydro-carbon gas and the other receiving the air-blast. The hydrocarbon is first vaporized and such vapor then conveyed to a highly heated retort, in passing through which it is converted into a fixed gas.

The steam or hydrogen and oxygen being subjected to great pressure in the generator A, create, as they pass through the chamber B and into the discharge pipe $f$, a vacuum in such chamber, and the hydrocarbon gas or air-blast, as the case may be, flow into such chamber, where they are mixed with the steam or other gases, and discharged with them through the pipe $f$. Suitable stop-cocks are placed in the pipes $e$, $g$, and $h$, so as to regulate the quantity of the several gases or admit to the vacuum-chamber either the carbon gas or the air-blast, as required. A proportion of about thirty gallons of water to about two of hydrocarbon oil supplies hydrogen and oxygen and carbon gas in such proportional quantities as prove satisfactory for the purposes intended.

The discharge pipe $f$ (and there may be a number of such discharge pipes) opens into the bottom or other part of the vessel C containing the liquid metal, the pressure of the gases being sufficient to cause such gases to pass through and pervade the metallic mass, and also prevent such metal passing into such tubes or pipes $f$.

By having complete and absolute control over the quantity of the gases that are to be passed through the melted iron and convert it into steel, steel with different proportions of carbon may be produced at pleasure.

It has been heretofore attempted to decarbonize and purify fluid iron by passing through the mass steam in combination with an air-blast, but the steam so used has been of such a temperature as to have the effect of cooling the fluid metal in passing through it, and the air-blast has been used in connection therewith to increase again its temperature. I prevent or avoid such reduction of temperature by heating the steam before it is forced through the metal to from 700° to 800° or 900° Fahrenheit, either actually decomposing the steam and resolving it into its constituent gases, or heating it almost to such point, so that it is decomposed and resolved into its gases as soon as it comes in contact with the fluid metal. The metal is thus continually kept at a high temperature, and the process of decarbonizing and purifying the mass is thus more rapidly effected and with greatly improved results.

I am aware that manganese has been made use of or applied in the conversion of iron into steel, and sometimes in connection with a hydrocarbon, but it has been introduced either in the cupola furnace or in the crucibles in which the steel was re-melted or applied in the cementing process, and when used with any hydrocarbon, it has been in connection with coal tar or similar cheap hydrocarbon containing sulphur and other impurities, which would injure rather than improve the metal with which it might be brought in contact. I am also aware that manganese is one of the elements or ingredients of what is called "prepared iron" or Spiegel-eisen, which is prepared to be mixed with melted iron after it has been decarbonized, to convert it into steel. When so applied, however, it is very difficult to obtain a thorough and uniform mixture of it with the entire mass of the iron, and such iron must also, in order to properly take and receive the benefit of the manganese, be free from sulphur, which is not the case with most iron unless specially refined. But by introducing the manganese into the fluid metal as it is received from the reducing furnace, and in combination with hydrocarbon gas wholly free from sulphur, phosphorus, and similar impurities, and with hydrogen and oxygen gases, or their equivalent and the air-blast, the metal is converted into steel with much less expense, and all danger of a too great use, or a use for a longer time than is proper, of the oxygen or carbon gases is overcome, as the quantity of either can be regulated according to the circumstances of any case. All previous treatment for freeing the iron from sulphur is also unnecessary, the hydrogen accomplishing such result. The introduction into the fluid mass of a small proportion of lead is also found effectual in removing or carrying off the sulphur and phosphorus that may still remain in the metal. The lead may be introduced in its solid form and mechanically mixed, or in the form of ground lead in connection with the gases.

What I claim as my invention, and desire to secure by Letters Patent, is—

Converting iron into steel while the former is in a liquid state, and as it is delivered from the furnace in which the ores are reduced, by the use and application to or passing through such liquid iron a blast of steam or hydrogen and oxygen heated to a temperature of from 700° to 800° Fahrenheit, or thereabouts, in combination first with an air-blast and afterwards with carbon gas, free from or obtained from hydrocarbons free from sulphur, phosphorus, ammonia, &c., and either with or without manganese.

S. C. SALISBURY.

Witnesses:
S. D. LAW,
FRED. B. SEARS.